United States Patent Office 2,968,007
Patented Jan. 10, 1961

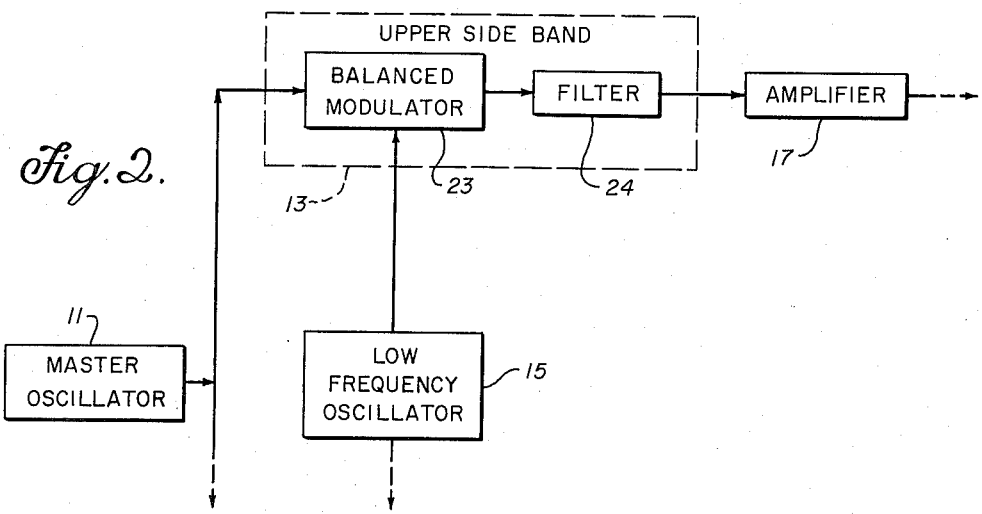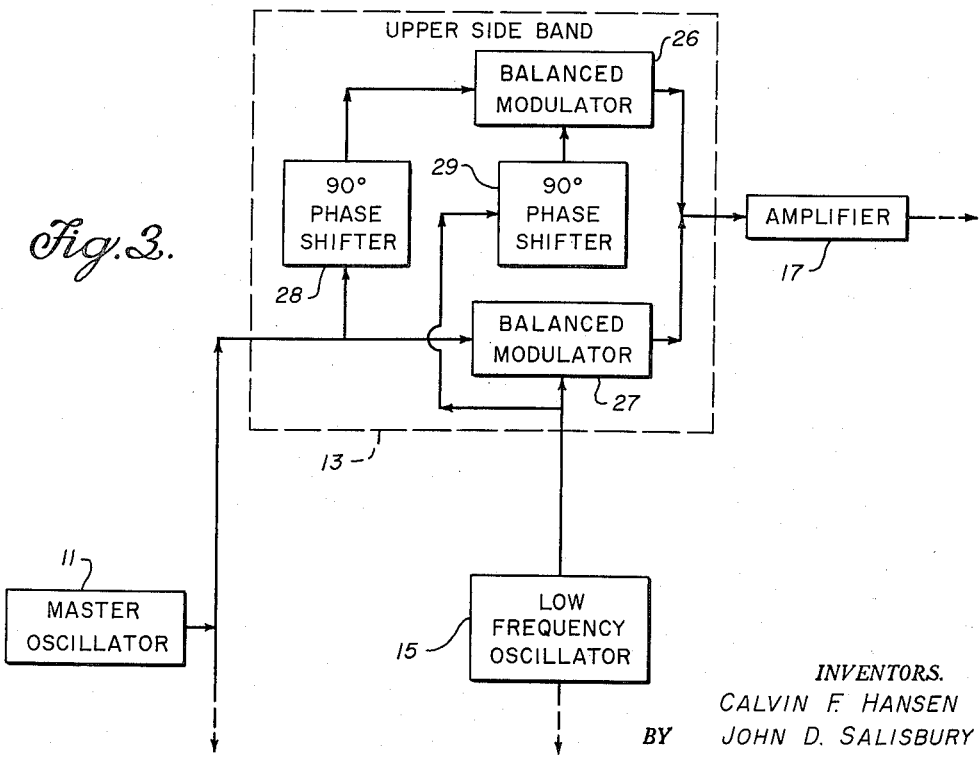

2,968,007

AUTOMATIC FREQUENCY CONTROL SYSTEM

Calvin F. Hansen, Bountiful, Utah, and John D. Salisbury, Livermore, Calif., assignors to the United States of America as represented by the United States Atomic Energy Commission Filed June 25, 1959, Ser. No. 823,278

7 Claims. (Cl. 331—11)

This invention relates to radio frequency cavity resonators, and more particularly to cavity resonators requiring adjustment to compensate for bilateral frequency drift.

This application is a continuation-in-part of application Serial No. 736,649 entitled "Automatic Frequency Control System," filed May 20, 1958, now abandoned, by the present inventors.

Circuits utilizing cavity resonators are generally affected by variations in temperature and humidity. A rise in temperature occurs when equipment is turned on, particularly after a prolonged period of shutdown, thereby causing a change in the physical volume of the cavity vessel and thus changing the electrical capacity of the system. Changing the electrical capacity thereby changes the natural resonating frequency of the circuit. Likewise, if the cavity is not evacuated, changes in humidity represent changes in the contribution of the dielectric material in the cavity and thereby affect the natural frequency of the cavity. There is, therefore, presented the general problem of synchronizing the resonant frequency of a tuned circuit with the frequency of a driving oscillator and more particularly, the problem of determining the direction of frequency drift and of altering the resonant frequency of the cavity to conform to the oscillator frequency.

Typical of the applications of the invention is usage in linear accelerators for charged particles, in which devices resonant cavity circuits are employed to increase the efficiency of the accelerator to the end of providing particle beams possessing greater energies. In these resonant cavity circuits, after a prolonged period of shutdown, a variety of mechanical methods have been heretofore employed to find the natural resonant frequency of the cavity and to then tune the cavity to the preselected operating frequency of the master oscillator driving the circuit. These methods often require considerable time, taking up a major portion of the useful operating time of the accelerator, the problem being greatly intensified when more than one cavity is excited from a single oscillator. The subject invention provides means for determining the resonant frequency of the cavity in relation to the frequency of the master oscillator whereupon the resonant frequency of the cavity is automatically adjusted to match that of the oscillator.

In its broad aspects the subject invention provides means whereby tuning is accomplished by a servo mechanism which is coupled to the cavity resonator as well as to bilateral error sensing circuits. A master oscillator is set to operate at a predetermined frequency near the natural frequency of the resonating circuit being driven. Error sensing circuitry coupled between the resonating circuit and master oscillator develops an error signal indicative of the non-resonance therebetween. This error signal is positive or negative according to the direction of frequency deviation and is proportional to the deviation from resonance. The servo mechanism employs the error signal to correct the resonant circuit so that resonant conditions are established between the master oscillator and the cavity resonator.

It is therefore an object of this invention to provide an electronic system for detecting the deviation of the resonant frequency of a cavity from a predetermined oscillator frequency.

It is a further object of this invention to provide an automatic control system for adjusting the resonant frequency of a cavity to a predetermined frequency.

It is a further object to provide a system for conveniently matching the resonant frequencies of a plurality of cavities excited from the same master oscillator.

Another object of this invention is to automatically tune a resonating cavity circuit to a predetermined frequency with improved sensitivity and accuracy.

Other objects and advantages of the invention will be apparent in the following description and claims considered together with the accompanying drawing, in which:

Figure 2 is a detailed diagram of the side band generating means of Figure 1 employing selective filters; and Figure 3 is a detailed diagram showing an alternate embodiment of the side band generating means of Figure 1 and employing balanced modulators and phase cancellation.

Figure 1:
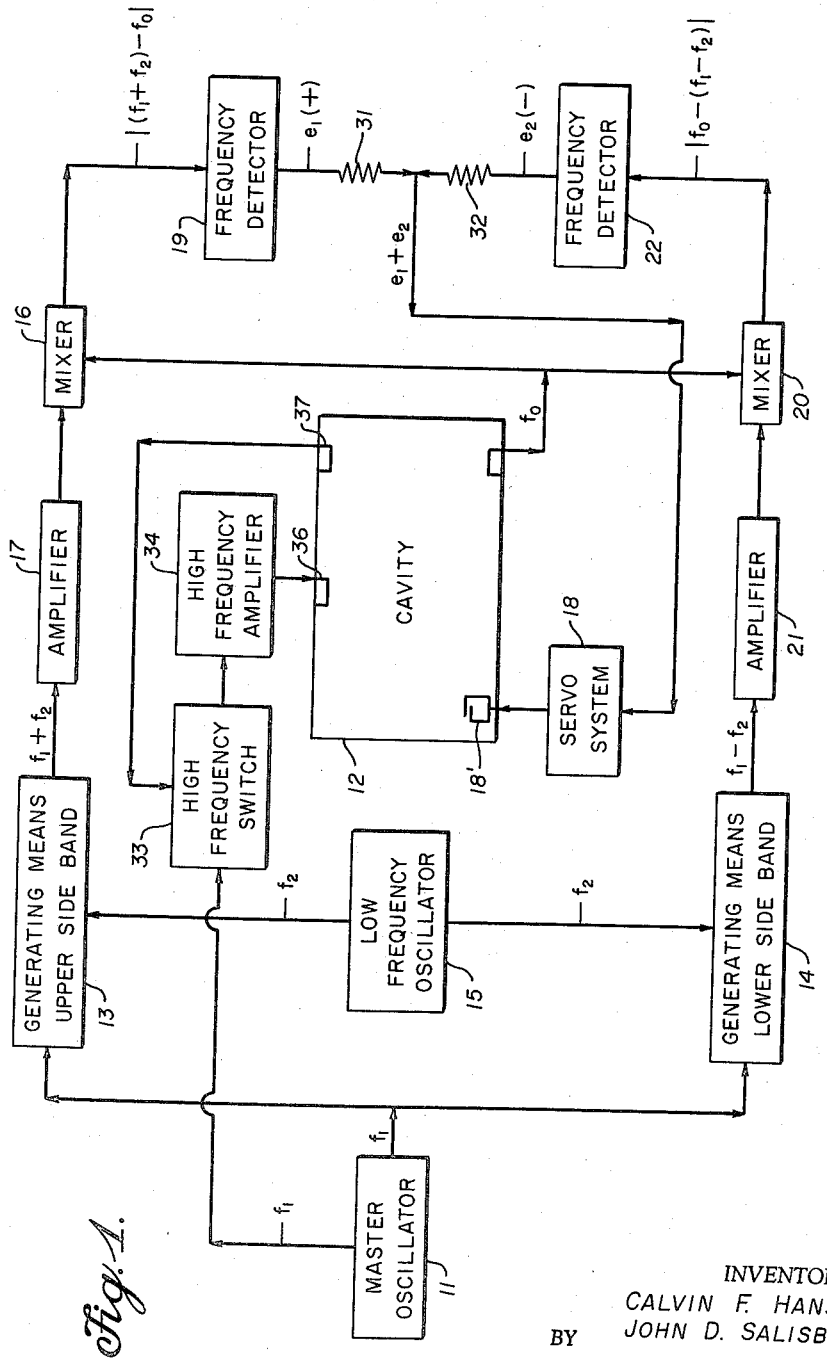
Fig. 1 is a block diagram showing a preferred embodiment of the invention.

Considering now the invention in detail and referring to the illustrated form thereof in the drawing, there is shown in Figure 1 a master oscillator 11 which is set to operate at a predetermined operating frequency and a resonant cavity 12 which under normal operating conditions is to be driven at this predetermined frequency. The master oscillator signal is applied to an upper side band generating means 13 and lower side band generating means 14. There is provided a low frequency oscillator 15 which is set to operate at a predetermined frequency of about five kilocycles per second and having an output applied to both the upper and lower side band generating means. The signals of master oscillator 11 and low frequency oscillator 15 are mixed in generating means 13, the resultant signal after mixing having a suppressed carrier (i.e., the signal from oscillator 11) with a single side band, the side band in this case being the upper side band. The side band signal frequency is a beat signal equal to the sum of the frequencies of the oscillator 11 signal and the oscillator 15 signal. A beat signal as here referred to is the sum and/or difference frequency signal produced as a result of heterodyning. Generating means 13, which mixes the two oscillator signals and produces the desired signal, is further described below in connection with Figures 2 and 3. The output signal from generating means 13 is applied to a mixer 16 through an amplifier 17. Although amplifier 17 is shown in this embodiment it may not be needed if the signal from generating means 13 possesses an appropriate amplitude. The cavity 12 is also coupled to mixer 16 and by means hereinafter described provides a signal at the resonant frequency of the cavity 12.

The resonant frequency of the cavity 12 is mixed with the upper side band signal in the mixer 16 and a beat frequency signal produced equal to the difference between the cavity frequency and the upper side band frequency, the other frequencies produced by such mixing being easily eliminated by simple filtering circuitry. If, for instance, the resonant frequency of cavity 12 is equal to that of master oscillator 11 the mixing thereof results in a difference frequency (beat signal) equal to the frequency of the low frequency oscillator 15. The mixer 16 is coupled to a servo system 18 through a frequency detector 19 and a first adder resistor 31. Frequency detector 19 rectifies the signal from mixer 16 and applies the resulting direct-current signal, hereinafter referred to as D.C., which has a magnitude that is proportional to the frequency of the output of mixer 16, to the servo system 18. Mixer 16 is a conventional mixer which may make use of any one of various mixing circuits that are suitable to the frequencies being considered. In one embodiment of the invention a semiconductor diode has been satisfactorily utilized as a mixer. Frequency detector 19 may be a simple resistance-capacitance circuit which produces a D.C. signal with magnitude proportional to the frequency of the signal being applied to the circuit.

In a similar manner to the upper side band system described hereinbefore, oscillator 11 and oscillator 15 are coupled to the lower side band generating means 14. The oscillator signals are mixed in lower side band generating means 14 and emerge as a signal having a suppressed carrier with a single side band (the lower side band). Two of the circuits suitable for the generating means 14 will be further described below in connection with Figures 2 and 3. The lower side band signal frequency is equal to the difference between the carrier (oscillator 11) frequency and the modulating (oscillator 15) frequency. The output of generating means 14 is coupled to a second mixer 20 by means of an amplifier 21. Amplifier 21 is of conventional design and is employed in the circuit only if the signal from generating means 14 does not have an appropriate amplitude. The cavity 12 is coupled to a second mixer 20 and the resonant frequency signal of cavity 12 is mixed with the lower side band in mixer 20 to produce a difference frequency (beat signal). Mixer 20 employs conventional mixing circuitry identical to mixer 16 and is coupled to the servo system 18 by means of a frequency detector 22. Frequency detector 22 rectifies the signal from mixer 20 and applies the resulting D.C. signal, which has a magnitude that is proportional to the difference frequency from the output of mixer 20, to the servo system 18 through a second adder resistor 32. Frequency detector 22 employs resistance-capacitance circuitry that is similar to that of frequency detector 19; however, the polarity of the output potentials are opposing. For instance, detector 19 may produce a positive output signal and detector 22 may produce a negative output signal. The resultant is determined in the first and second adder resistor 31 and 32 and then applied to the servo system 18. The frequency detectors 19 and 22 operate in such a manner that the respective positive and negative D.C. voltages thereof vary in amplitude depending upon the frequencies of the respective incoming signals, the D.C. voltages increasing in magnitude with increase in input frequency. The two detectors (19 and 22) include adjusting means whereby both may be set to produce a precise zero voltage when no error in resonating conditions exists between cavity 12 and oscillator 11, the detector output signals in this condition being equal but opposite in polarity to provide mutual cancellation at the juncture of the adder resistors 31 and 32. A servo 18 is coupled to cavity 12 for adjusting the cavity to equalize the resonant frequencies of the cavity and master oscillator 11. The servo system 18 consists of an adjusting means 18' comprising an electric motor operating a conventional rotating tuning loop mechanism which alters the electrical capacity of the cavity thus changing the resonating frequency thereof.

When the cavity 12 is tuned to the frequency of the master oscillator 11, the oscillator output is coupled through a high frequency, electronic switch 33 simulating the action of a single-pole double-throw switch, to a high frequency amplifier 34 which provides an amplifier output signal to an input loop 36 in the cavity 12. When frequency adjustment of the cavity 12 is necessary, the master oscillator 11 is decoupled from the cavity 12 by operation of the high frequency switch 33 and a feedback loop 37 in the cavity 12 is connected through the switch 33 to the input of the high frequency amplifier 34. The described circuit configuration acts as an oscillator wherein the frequency determining tuned circuit is the cavity 12. Therefore, the output frequency from the cavity 12 is the natural frequency thereof. When the resonant frequency of the cavity 12 is adjusted to within a few cycles of the master oscillator 11 frequency, the high frequency switch 33 is operated to couple the high frequency amplifier 34 to the master oscillator 11 and disconnect the feedback loop 37. With such connections the circuit is in the normal operating condition and other conventional means are utilized to maintain the resonant frequency of the cavity 12 tuned to the oscillator 11. Thus the present invention is normally utilized to provide initial tuning of the cavity 12 only at times when the equipment is being started up.

Several different circuits may be employed in the generating means 13 and 14 for producing a single side band signal. In Figure 2 of the drawing there is shown generating means circuitry wherein filters are employed to provide an appropriate signal. In Figure 2, only the upper generating means 13 is shown, the lower generating means 14 being of similar design. The master and low frequency signals are coupled to a balanced modulator 23. Such balanced modulators are commonly employed for generating a double-side-band wave with the carrier suppressed and many conventional types that are suitable for this purpose exist. Balanced modulator 23 is coupled to amplifier 17 by means of a filter 24. A carrier signal with one side band can be obtained by passing the output of the balanced modulator 23 through a filter circuit 24 that is sufficiently selective to transmit one side band while suppressing the other.

In Figure 3 of the drawing there is shown an alternate form of generating means circuit for producing a single side band. This circuit obtains a single side band by eliminating the undesirable side band through phase cancellation. Master oscillator 11 is coupled to a balanced modulator 26 and to a balanced modulator 27 with a 90°-phase-shifter 28 arranged to be coupled between oscillator 11 and modulator 26. The two balanced modulators, 26 and 27, are thus arranged with inputs that differ in phase by 90°, the input to modulator 26 being 90° out of phase with the input to modulator 27. Low frequency oscillator 15 is coupled to modulator 27 directly and to modulator 26 by means of 90°-phase-shifter 29. The outputs of modulators 26 and 27 are coupled to amplifier 17. The modulating inputs to the modulators 26 and 27 are thus identical except that each frequency component of the modulating voltage must be applied to each of the modulators so that corresponding components differ by 90° phase. It is found that when the outputs of the two modulators 26 and 27 are added, one of the side bands is canceled. For this reason, together with the fact that the carrier is suppressed by the balanced modulators, there results an output that contains only a single side band, in this case the upper side band. The lower side band generating means employs similar circuitry with appropriate polarity thereby producing the desired lower side band carrier signal. Phase shifters 28 and 29 are conventional in design and any one of many known suitable circuits may be employed.

Considering now the operation of the invention, first assume that no resonance error exists between master oscillator 11 and cavity 12 and that the feedback loop 37 is connected through the high frequency switch 33 to the input of amplifier 34. Master oscillator 11 is set to generate the desired cavity frequency $f_1$, for example 24,000 megacycles, and oscillator 15 is set to generate a frequency, $f_2$, for example 5.0 kilocycles. Upper side band generating means 13 will produce a summation frequency $f_1+f_2$ or 24.005 mc. and lower side band generating means 14 will produce a difference frequency $f_1-f_2$ or 23.995 mc. The oscillator comprised of feedback loop 37 and amplifier 34 with cavity 12 as the frequency determining element, provides a signal $f_0$ which is coupled to the mixers 16 and 20. Mixer 16 will mix the frequency $f_1+f_2$ and $f_0$, and the resulting signal will be equal to the absolute value of $(f_1+f_2)-f_0$, in this case 5 kc. In a like manner mixer 20 will mix the frequency $f_1-f_2$ and $f_0$ and the resulting signal will be equal to the absolute value of $f_0-(f_1-f_2)$ in this case again 5 kc. Detector 19 will produce a positive voltage, $e_1$, proportional to the 5 kc. signal from mixer 16. In a like manner, detector 22 will produce a negative voltage, $e_2$, proportional to the 5 kc. signal from mixer 20. The two detector voltages $e_1$ and $e_2$ are then combined algebraically in the adder resistors 31 and 32 and the resulting voltage, $e_1+e_2$, is applied to the servo 18 which will then make the required corrections on cavity 12, thereby restoring resonance. Since $e_1+e_2=0$ in this example the servo system will make no correction. It is important to note that the two detectors, 19 and 22, must be properly balanced so that they have identical frequency characteristics.

In another example the cavity 12 can be considered to be detuned 3 kc. below the oscillator 11. The natural frequency of cavity 12 therefore has drifted to 23.997 mc. while master oscillator 11 is operating at a frequency of 24.000 mc. Cavity 12 must be adjusted so that its natural frequency is 24.000 mc. before the oscillator 11 is coupled thereto for normal operation. Oscillator 15 generates a signal of 5 kc. and, as before, the side bands $f_1+f_2=24.005$ mc. and $f_1-f_2=23.995$ mc. In the mixer 16, $f_0$ is combined with upper side band $f_1+f_2$ to produce:

$(f_1+f_2)-f_0=24.005$ mc.$-23.997$ mc.$=0.008$ mc. or 8 kc.

In like manner the output signal from mixer 20 is:

$f_0-(f_1-f_2)=23.997$ mc.$-23.995$ mc.$=0.002$ mc. or 2 kc.

The magnitude of the voltages $e_1$ and $e_2$ from the frequency detectors 19 and 22 are proportional to the frequencies 8 kc. and 2 kc., respectively; however, $e_1$ has a positive polarity and $e_2$ a negative polarity. The resultant difference between the two potentials is applied to the servo system 18 and corrective tuning of the cavity 12 is provided to align the resonant frequency thereof with the frequency of the master oscillator 11.

The cavity frequency $f_0$ need not fall between the upper and lower side band frequencies. If $f_0$ is 24.010 mc. then the signal out of the mixer 16 is:

$f_0-(f_1+f_2)=24.010$ mc.$-24.005$ mc.$=0.005$ mc. or 5 kc.

The signal out of mixer 20 is:

$f_0-(f_1-f_2)=24.010-23.995$ mc.$=0.015$ mc. or 15 kc.

Thus the resultant signal applied to the servo system 18 is the difference between the potentials $e_1$, and $e_2$ as produced by 5 kc. and 15 kc. signals, respectively.

In one embodiment of the invention is was found preferable to pre-excite the cavity 12 from the oscillator 11 for a few microseconds before connecting the feedback loop 37 to the amplifier 34 input to aid in initiating oscillation in the oscillator comprised of feedback loop 37, high frequency amplifier 34 and cavity 12. The master oscillator 11 in this instance cannot be connected to a mistuned load except for very short time periods; however, such pre-excitation is generally necessary for cavities under vacuum to overcome the effects of multipactoring. It will be apparent that the frequency of the master oscillator 11 might be varied to match that of the cavity 12 without departing from the purview of the invention.

While the salient features of the invention have been described in detail with respect to one embodiment it will be apparent that numerous modifications may be made within the spirit and scope of the invention, and it is therefore not desired to limit the invention to the exact details shown except insofar as they may be defined in the following claims.

What is claimed is:

1. In a system for equalizing the frequency of a cavity resonator and a high frequency oscillator energizing said resonator, the combination comprising a low frequency oscillator, an upper side band producing circuit receiving signals from said high frequency oscillator and said low frequency oscillator, a lower side band producing circuit receiving signals from said high frequency oscillator and said low frequency oscillator, a cavity oscillator operable at the resonant frequency of said cavity, a switch having a first setting inactivating said cavity oscillator and coupling said high frequency oscillator to said cavity, said switch having a second setting activating said cavity oscillator and decoupling said high frequency oscillator from said cavity, a first mixer combining the outputs of said upper side band circuit and said cavity oscillator; a second mixer combining the outputs of said lower side band circuit and said cavity oscillator, a first frequency responsive detector coupled to the output of said first mixer, a second frequency responsive detector coupled to the output of said second mixer, and a frequency regulating means responsive to the outputs of said first and second detectors and operable to equalize the frequencies of said high frequency oscillator and said cavity.

2. In a frequency control for a resonant cavity, the combination comprising a master oscillator, an amplifier having an output coupled to said cavity, a feedback loop coupled to said cavity, a switching means having a first setting coupling said master oscillator to said amplifier and having a second setting coupling said feedback loop to said amplifier, a low frequency source, an upper and lower side band generating means receiving signals from said low frequency source and said master oscillator, a first mixer combining an output signal from said cavity with the upper side band from said side band generating means, a second mixer combining the output signals from said cavity with the lower side band from said side band generating means, a first frequency detector responsive to the output of said first mixer, a second frequency detector responsive to the output of said second mixer, and a tuning element in said cavity responsive to the outputs of said first and second frequency detectors.

3. In a control for tuning the frequency of a resonant cavity to that of a master oscillator, the combination comprising a low frequency generator, an upper side band generator coupled to the output of said master oscillator and said low frequency generator, a lower side band generator coupled to the output of said master oscillator and said low frequency generator, a cavity oscillator having said cavity as a resonant frequency determining element, a switch having a first condition coupling said master oscillator to said cavity and having a second condition activating said cavity oscillator, a first mixer having inputs coupled to said cavity oscillator and said upper side band generator, a second mixer having inputs coupled to said cavity oscillator and said lower side band generator, frequency detecting and comparing means coupled to the outputs of said first and said second mixers, an adjustable cavity tuning means, and a control system responsive to the output from said frequency generator and controlling said cavity tuning means.

4. In a system for centering a variable frequency midway between two side band reference frequencies, the combination comprising a master oscillator, a low frequency generator, a side band generator coupled to said master oscillator and said low frequency generator and having a first and second output comprising an upper and a lower side band signal respectively, a resonant cavity, an amplifier having an output coupled to said cavity, a feedback loop connected with said cavity, a switch coupling said master oscillator to said amplifier in a first position and coupling said feedback loop to said amplifier in a second position, a first mixer receiving an output signal from said cavity and receiving said first output of said side band generator, a second mixer receiving an output signal from said cavity and receiving said second output of said side band generator, a first frequency detector coupled to the output of said first mixer, a second frequency detector coupled to the output of said second mixer and responding inversely to signals therefrom with regard to the response of said first frequency detector to signals from said first mixer, tuning means in said cavity, and a servo system responsive to the resultant outputs of said first and second frequency detectors and controlling said tuning means whereby said cavity frequency is tuned midway between said upper and lower side band signals.

5. In an automatic tuning system for a cavity resonator, the combination comprising a master oscillator, a low frequency generator, a first side band generator producing an output frequency equaling the sum of said master oscillator and said low frequency generator frequencies, a second side band generator producing an output frequency equaling the difference of said master oscillator and said low frequency generator frequencies, an amplifier having an output coupled to said cavity, a feedback loop in said cavity, a switch having a first position coupling said master oscillator to said amplifier and having a second position coupling said feedback loop to said amplifier, a first mixer receiving an output signal from said cavity and receiving said sum frequency, a second mixer receiving the output signal from said cavity and receiving said difference frequency, a first and a second frequency detector coupled to the outputs of said first and second mixers respectively, said frequency detectors having mutually opposing output signals, combining means receiving the outputs of said frequency detectors, a frequency adjusting element in said cavity, and a servo system responsive to the output of said combining means and controlling said frequency adjusting element in response thereto.

6. In a tuning control for a resonant cavity, the combination comprising a master oscillator, an amplifier having an output coupled to said cavity, a feedback loop connected with said cavity, a switch having a first position coupling said master oscillator to said amplifier and having a second position coupling said feedback loop to said amplifier, a low frequency source, an upper side band generator receiving the outputs of said master oscillator and said source, a lower side band generator receiving the outputs of said master oscillator and said source, a first mixer receiving the outputs of said upper side band generator and said cavity, a second mixer receiving the outputs of said lower side band generator and said cavity, a first and a second frequency detector receiving the outputs of said first and second mixers respectively, one of said frequency detectors being of the class responding in a positive voltage direction with input frequency and the other of said detectors being of the class varying in a negative voltage direction with frequency, a mixing means combining the outputs of said first and second frequency detectors, a tuning means in said cavity, and a servo system receiving the output of said mixing means and controlling said tuning means in response thereto whereby the resonant frequency of said cavity may be tuned to the frequency of said master oscillator.

7. In a system for synchronizing the frequency of a resonant cavity with the frequency of a master oscillator, the combination comprising a low frequency oscillator, an upper side band generator coupled to the outputs of said master oscillator and said low frequency generator, a lower side band generator coupled to the outputs of said master oscillator and said low frequency generator, a feedback means in said cavity, an amplifier having an output coupled to said cavity, a switch having a first condition coupling said master oscillator to said amplifier and having a second condition coupling said feedback loop to said amplifier, a first mixer coupled to the outputs of said upper side band generator and said cavity, a second mixer coupled to the outputs of said lower side band generator and said cavity, a first frequency detector coupled to the output of said first mixer, a second frequency detector coupled to the output of said second mixer, and a tuning control coupled to the outputs of said first and second frequency detectors and matching the frequency of said master oscillator to that of said cavity when said switch is in said second condition.

References Cited in the file of this patent

UNITED STATES PATENTS

| | | |
|---|---|---|
| 2,632,871 | Erickson et al. | Mar. 24, 1953 |
| 2,691,726 | Leypold | Oct. 12, 1954 |
| 2,851,658 | Howson | Sept. 9, 1958 |
| 2,919,403 | Buntenbach | Dec. 29, 1959 |